US009178210B2

(12) United States Patent
Matulevich et al.

(10) Patent No.: US 9,178,210 B2
(45) Date of Patent: Nov. 3, 2015

(54) NEGATIVE ACTIVE MATERIAL FOR LITHIUM BATTERY, METHOD OF PREPARING THE NEGATIVE ACTIVE MATERIAL, AND LITHIUM BATTERY EMPLOYING THE NEGATIVE ACTIVE MATERIAL

(71) Applicant: Samsung SDI Co., Ltd., Yongin-si, Gyeonggi-do (KR)

(72) Inventors: Yury Matulevich, Yongin-si (KR);
Sung-Hwan Moon, Yongin-si (KR);
Jong-Seo Choi, Yongin-si (KR);
Jae-Hyuk Kim, Yongin-si (KR);
Chun-Gyoo Lee, Yongin-si (KR);
Seung-Uk Kwon, Yongin-si (KR);
Yo-Han Park, Yongin-si (KR);
Soon-Sung Suh, Yongin-si (KR);
Chang-Ui Jeong, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 114 days.

(21) Appl. No.: 13/755,226

(22) Filed: Jan. 31, 2013

(65) Prior Publication Data
US 2014/0038051 A1    Feb. 6, 2014

(30) Foreign Application Priority Data
Aug. 1, 2012    (KR) .................. 10-2012-0084579

(51) Int. Cl.
| H01M 4/38 | (2006.01) |
| H01M 4/36 | (2006.01) |
| H01M 4/134 | (2010.01) |
| H01M 4/62 | (2006.01) |

(52) U.S. Cl.
CPC .............. *H01M 4/134* (2013.01); *H01M 4/364* (2013.01); *H01M 4/366* (2013.01); *H01M 4/386* (2013.01); *H01M 4/626* (2013.01); *Y02E 60/122* (2013.01)

(58) Field of Classification Search
None
See application file for complete search history.

(56) References Cited

U.S. PATENT DOCUMENTS

| 5,422,188 | A * | 6/1995 | Lagain et al. ................. 428/549 |
| 6,787,232 | B1 | 9/2004 | Chiang et al. |
| 7,842,377 | B2 | 11/2010 | Lanphere et al. |
| 8,048,563 | B2 | 11/2011 | Konishiike et al. |
| 2006/0134524 | A1 | 6/2006 | Nakai et al. |
| 2009/0029045 | A1 | 1/2009 | Yuan et al. |
| 2009/0263717 | A1 | 10/2009 | Ramasubramanian et al. |
| 2010/0203388 | A1 | 8/2010 | Kim et al. |
| 2010/0310940 | A1 | 12/2010 | Kim et al. |
| 2011/0052991 | A1 | 3/2011 | Kim et al. |
| 2012/0202113 | A1 | 8/2012 | Hodge et al. |

FOREIGN PATENT DOCUMENTS

JP    2004-335272    11/2004

* cited by examiner

Primary Examiner — Cynthia K Walls
(74) Attorney, Agent, or Firm — Robert E. Bushnell, Esq.

(57) ABSTRACT

A negative active material for a lithium battery with an improved cycle characteristic and capacity retention rate, and the negative active material comprises a plurality of particles comprising a plurality of first particles comprising Si, Ti, and Ni; and composite particles comprising a plurality of second particles in which at least one element selected from the group consisting of Cu, Fe, Ni, Au, Ag, Pd, Cr, Mn, Ti, B, and P is partially or completely deposited on surface(s) of other of first particles, a method of preparing the negative active material, and a lithium battery including a negative electrode including the negative active material.

11 Claims, 5 Drawing Sheets

NEGATIVE ACTIVE MATERIAL FOR LITHIUM BATTERY, METHOD OF PREPARING THE NEGATIVE ACTIVE MATERIAL, AND LITHIUM BATTERY EMPLOYING THE NEGATIVE ACTIVE MATERIAL

CLAIM OF PRIORITY

This application makes reference to, incorporates the same herein, and claims all benefits accruing under 35 U.S.C. §119 from an application for NEGATIVE ACTIVE MATERIAL, METHOD OF PREPARING NEGATIVE ACTIVE MATERIAL, AND LITHIUM BATTERY EMPLOYING NEGATIVE ACTIVE MATERIAL earlier filed in the Korean Intellectual Property Office on 1 Aug. 2012 and there duly assigned Serial No, 10-2012-0084579.

BACKGROUND OF THE INVENTION

1. Field of the Invention

The present invention relate to a negative active material, a method of preparing the negative active material, and a lithium battery including the negative active materials, and more particularly, to a negative active materials with an improved cycle characteristic and capacity retention rate, a method of preparing the negative active material, and a lithium battery including the negative active material.

2. Description of the Related Art

Lithium batteries used in portable electronic devices for information communication, such as personal digital assistances (PDAs), mobile phones, or notebook computers, electric bicycles, electric vehicles, or the like have discharge voltages that are at least two times greater than that of existing batteries. Accordingly, lithium batteries exhibit high energy densities.

A typical lithium battery includes a positive electrode, a negative electrode, and either an organic electrolytic solution or a polymer electrolyte filling the space between the positive and negative electrodes. The positive and negative electrodes each include an active material that allows lithium ions to be intercalated and deintercalated. In this structure, when lithium ions are intercalated and deintercalated in the positive and negative electrodes, oxidation and reduction reactions occur, and thus, electrical energy is generated.

The positive active materials of positive electrodes for lithium batteries may be, for example, oxides of lithium and a transition metal that allow intercalation of lithium ions, such as a lithium cobalt oxide ($LiCoO_2$), a lithium nickel oxide ($LiNiO_2$), or a lithium nickel cobalt manganese oxide (e.g., $Li(NiCoMn)O_2$ or $Li(Ni_{1-x-y}Co_xMn_y)O_2$ (0<x<1, 0<y<1, and 0<x+y<1).

Research into negative active materials of negative electrodes for lithium batteries that allow intercalation and deintercalation of lithium ions, such as various types of carbonaceous materials including artificial and natural graphite and hard carbon, and non-carbonaceous materials such as Si with a high capacity, has been conducted.

However, non-carbonaceous materials such as Si repeatedly undergo volumetric expansion and contraction during intercalation and deintercalation of lithium ions, and thus, a negative electrode including such a non-carbonaceous material has an unstable structure and decreased cycle life. To address problems with carbonaceous and non-carbonaceous active materials, research into Si-based alloys has been conducted.

A Si-based alloy generally has an active Si phase and an inactive matrix phase. However, due to such two phases, Si-based alloys other than some non-Si-based alloys having a one-matrix phase have lower capacities than silicon.

Therefore, there is still a need to develop a negative active material such as a Si-based alloy with improved cycle characteristics and an improved capacity retention rate, a method of preparing the negative active material, and a lithium battery including the negative active material.

SUMMARY OF THE INVENTION

One or more embodiments of the present invention may include negative active materials having an improved cycle characteristic and capacity retention rate.

One or more embodiments of the present invention may include methods of preparing the negative active materials.

One or more embodiments of the present invention may include lithium batteries including negative electrodes including the negative active materials.

Additional aspects will be set forth in part in the description which follows and, in part, will be apparent from the description, or may be learned by practice of the presented embodiments.

According to one or more embodiments of the present invention, a negative active material for a lithium battery may includes a plurality of first particles comprising Si, Ti, and Ni; and composite particles comprising a plurality of second particles in which at least one element selected from the group consisting of Cu, Fe, Ni, Au, Ag, Pd, Cr, Mn, Ti, B, and P is partially or completely deposited on surface(s) of other of first particles.

The composite particles may be comprised of a plurality of second particles in which an element selected from the group consisting of Ni, $Ni_{1-x}P_x$ (where 0.1≤x≤0.3), and $Ni_{1-x}B_x$ (where 0.1≤x≤0.3) is partially or completely deposited on surface(s) of other of first particles.

The composite particles may comprise a plurality of second particles in which Ni is partially or completely deposited on surface(s) of other of first particles.

The composite particles may be formed in a plurality of island types among the plurality of first particles.

The composite particles may be constituted of 50% or less of the total number of the plurality of first particles.

The composite particles may be constituted of about 10% to about 30% of the total number of the plurality of first particles.

In some embodiments, the second particles of the composite particles may have an average diameter of about 40 nm to about 400 nm.

In some embodiments, the amount of the second particles of the composite particles may be in a range of about 3 to about 30 atomic percent (at %).

In some embodiments, the plurality of first particles may be crystalline alloy particles.

In some embodiments, the plurality of first particles may have a median particle diameter (D50) of about 0.1 μm to about 10 μm.

In some embodiments, the plurality of first particles may have a composition represented by Formula 1 below:

$$xSi\text{-}yTi\text{-}zNi \qquad <\text{Formula 1}>$$

wherein 50 at %≤x≤80 at %, 5 at %≤y≤30 at %, 5 at %≤z≤30 at %, and x+y+z=100 at %.

According to one or more embodiments of the present invention, a method of preparing a negative active material for a lithium battery may includes preparing a plurality of first particles comprising Si, Ti, and Ni; preparing composite particles comprising a plurality of second particles in which at least one element selected from the group consisting of Cu, Fe, Ni, Au, Ag, Pd, Cr, Mn, Ti, B, and P is partially or completely deposited on surface(s) of other of first particles; and heat-treating the composite particles.

In some embodiments of the method, the plurality of first particles may be crystalline alloy particles.

In some embodiments of the method, the plurality of first particles may have a composition represented by Formula 1 below:

$$xSi\text{-}yTi\text{-}zNi \qquad \text{<Formula 1>}$$

wherein 50≤x≤80 (at %), 5≤y≤30 (at %), 5≤z≤30 (at %), and x+y+z=100 (at %)

In some embodiments of the method, the plurality of first particles may have a median particle diameter (D50) of about 0.1 μm to about 10 μm.

In some embodiments of the method, the second particles may have an average diameter of about 40 nm to about 400 nm.

In some embodiments of the method, the amount of the second particles may be about 3 to about 30 atomic percent (at %).

In some embodiments of the method, the preparing of the composite particles may be performed by physical vapor deposition, chemical vapor deposition, electroplating, or electroless plating.

In some embodiments of the method, the heat treating of the composite particles may be performed at a temperature from about 300° C. to about 600° C.

According to one or more embodiments of the present invention, a lithium battery may include a positive electrode comprising a positive active material; a negative electrode comprising the negative active material described above; and an electrolyte interposed between the positive electrode and the negative electrode.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
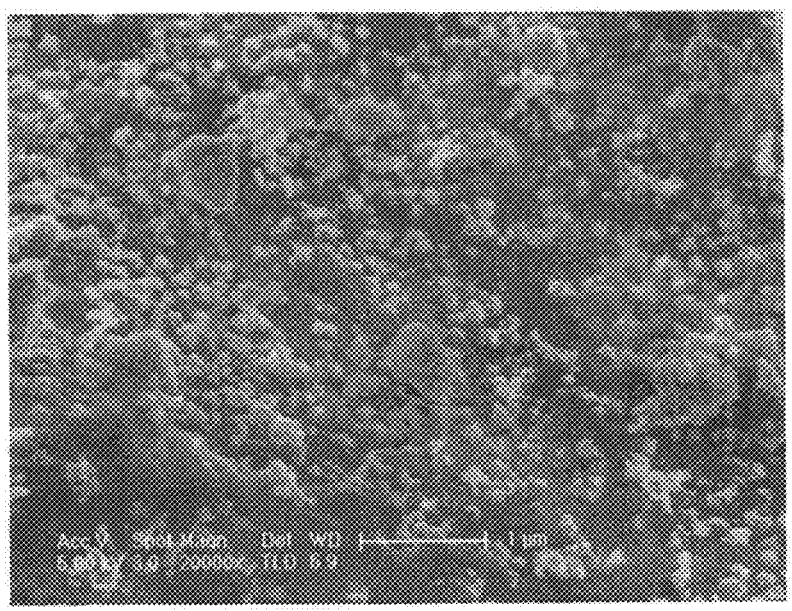
FIG. 1 is a scanning electron microscopic (SEM) image showing a negative active material according to an embodiment of the present invention.

Hereinafter, the present invention will be described more fully with reference to the accompanying drawings. Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As used herein, the term "and/or" includes any and all combinations of one or more of the associated listed items. Expressions such as "at least one of," when preceding a list of elements, modify the entire list of elements and do not modify the individual elements of the list.

A negative active material according to an exemplary embodiment of the present invention, a method of preparing the negative active material, and a lithium battery employing the negative active material will be described in detail. However, these embodiments are provided only for illustrative purposes and are not intended to limit the scope of the present invention.

According to an embodiment of the present invention, a negative active material for a lithium battery may includes a plurality of first particles including Si, Ti, and Ni and composite particles, wherein the composite particles may comprises a plurality of second particles in which at least one element selected from the group consisting of Cu, Fe, Ni, Au, Ag, Pd, Cr, Mn, Ti, B. and P is partially or completely deposited on surface(s) of other of first particles.

As used herein, the term "first particles" refers to a cluster of particles including Si, Ti, and Ni; the term "a plurality of first particles" refers to one to tens of the first particles.

Since the negative active material includes the first particles having a high capability of intercalating and deintercalating lithium ions and the composite particles comprised of a plurality of second particles that do not interfere with an approach of lithium ions to an active Si phase capable of reversibly reacting with the lithium ions and suppresses a side reaction with an electrolytic solution, a lithium battery including the negative active material may have a high electric conductivity and an improved cycle characteristic and capacity retention rate.

The composite particles may be comprised of a plurality of second particles in which an element selected from the group consisting of Ni, $Ni_{1-x}P_x$ (where 0.1<x<0.3) and $Ni_{1-x}B_x$ (where 0.1≤x≤0.3) is partially or completely deposited on surface(s) of other of first particles. For example, the composite particles may be comprised of a plurality of second particles in which Ni is partially or completely deposited on surface(s) of other of first particles.

The composite particles undergo a significantly reduced volumetric change during charging, and include Ni itself with high electrical conductivity, and thus, the composite particles act as a medium for conducting the alloy particles (i.e. the first particles). Therefore, a negative active material including the composite particles may have an increased electrical conductivity.

In an embodiment, the composite particles may be formed in a plurality of island types among the plurality of first particles.

The composite particles may have an efficient structure that does not interfere with the approach of lithium ions to an active Si phase of the first particles, and thus, a negative active material including the composite particles may have an improved cycle characteristic and capacity retention rate.

The composite particles may be constituted of 50% or less, for example, 30% or less, for example, about 10 to about 30%, of the total number of the first particles.

As used herein, the constitution rate of the composite particles indicates an occupying rate of the composite particles in the total number of the first particles.

When the constitution rate of the composite particles in the total number of the first particles is within the ranges described above, a negative active material including the composite particles may enhance an electrical conductivity.

The second particles of the composite particles may have an average diameter of about 40 nm to about 400 nm, for example, about 50 nm to about 400 nm, for example, about 50 nm to about 300 nm.

When the average diameter of the second particles is within the ranges described above, a negative active material including the second particles may enable the first particles to have an improved electrical property and suppress a side reaction with an electrolytic solution, thereby having an improved capacity characteristic.

As used herein, the average diameter means an average of cumulative diameters corresponding to 50 volume % and 75 volume % in a cumulative particle-size distribution curve based on a total volume of 100%. The average diameter of the second particles may be confirmed by measurement from a scanning electron microscopic (SEM) image of a negative active material illustrated in FIG. 1.

The amount of the second particles of the composite particles may be about 3 to about 30 at %. For example, in some embodiments, the amount of the second particles of the composite particles may be about 5 to about 25 at %, and in other embodiments, may be about 7 to about 25 at %.

The amount of the second particles may be obtained using an energy dispersing X-ray (EDX) analyzer by analyzing a portion of a region of the second particles and analyzing an atomic percent of an element contained in the second particles.

If the second particles is prepared by depositing Ni on surface(s) of first particles, however, the amount of the second particles may be obtained after subtracting an atomic percent of Ni contained in second particles in a negative active material from an atomic percent of Ni contained in first particles that are not coated with Ni, i.e. only a plurality of first particles.

When the amount of the second particles of the composite particles is within the ranges described above, a negative active material including the second particles comprised of an element, for example, Ni, may have a high capacity per weight and an improved cycle characteristic.

In some embodiments, the plurality of first particles may be crystalline alloy particles.

A negative active material including the crystalline alloy particles may have a high electrical conductivity, and may be easily prepared, as the negative active material does not require an additional process for improving surface conductivity.

The plurality of first particles may have a median particle diameter (D50) of about 0.1 to about 10 μm. For example, in some embodiments, the plurality of first particles may have a D50 of about 0.5 to 10 μm, and in other embodiments, the plurality of first particles may have a D50 of about 1 to about 7 μm. The D50 of the plurality of first particles may be confirmed by measurement from the SEM image of the negative active material illustrated in FIG. 1.

The plurality of first particles may have a composition represented by Formula 1 below:

$$x\text{Si-}y\text{Ti-}z\text{Ni} \qquad \text{<Formula 1>}$$

wherein 50 at %≤x≤80 at %, 5 at %≤y≤30 at %, 5 at %≤z≤30 at %, and x+y+z=100 at %.

In Formula 1, x may be 50 at % to 80 at %, for example, 50 at % to 70 at %, y may be 5 at % to 30 at %, for example, 5 at % to 20 at %, and z may be 5 at % to 30 at %, for example, 10 at % to 30 at %.

A negative active material including the plurality of first particles having the composition of Formula 1 has a matrix phase having a ratio of atomic percents of Si to Ti to Ni of 7:4:4 that does not react with lithium ions. In this regard, the matrix phase suppresses a large volumetric change of Si during charging and discharging, and thus, the negative active material having the matrix phase may have an improved electronic conductivity and an improved cycle characteristic.

According to another embodiment of the present invention, a method of preparing a negative active material for a lithium battery may include preparing a plurality of first particles including Si, Ti, and Ni; preparing composite particles comprised of a plurality of second particles in which at least one element selected from the group consisting of Cu, Fe, Ni, Au, Ag, Pd, Cr, Mn, Ti, B, and P is partially or completely deposited on surface(s) of other first particles; and heat-treating the composite particles.

In some embodiments of the method, the plurality of first particles may be prepared in the form of powder by mechanical milling, such as ball milling. The plurality of first particles may have a D50 of about 0.1 μm to 10 μm. For example, in some embodiments, the first particles may have a D50 of 7 μm or less, in some embodiments of the method, the plurality of first particles may be crystalline alloy particles. The first particles themselves are a good electric conductor with an inactive matrix phase, and an additional process is not needed when at least one element particle selected from Cu, Fe, Ni, Au, Ag, Pd, Cr, Mn, Ti, B, and P is deposited on the first particles.

In some embodiments of the method, the plurality of first particles may have a composition represented by Formula 1 below;

$$x\text{Si-}y\text{Ti-}z\text{Ni} \qquad \text{<Formula 1>}$$

wherein 50 at %≤x≤80 at %, 5 at %≤y≤30 at %, 5 at %≤z≤30 at %, and x+y+z=100 at %.

In Formula 1, x may be 50 at % to 80 at %, for example, 50 at % to 70 at %, y may be 5 at % to 30 at %, for example, 5 at % to 20 at %, and z may be 5 at % to 30 at %, for example, 10 at % to 30 at %.

A negative active material including the plurality of first particles having the composition of Formula 1 may have an improved electronic conductivity and an improved cycle characteristic.

In some embodiments of the method, the second particles may have an average diameter of about 40 nm to about 400 nm. For example, in some embodiments, the second particles may have an average diameter of about 50 nm to about 400 nm, and in other embodiments, the second particles may have an average diameter of about 50 nm to about 300 nm.

When the average diameter of the second particles is within the above-described ranges, a negative active material including the composite particles comprised of a plurality of second particles may enhance an electrical property of the first particles and suppress a side reaction with an electrolytic solution, and thus, the negative active material may have an improved capacity characteristic.

In some embodiments of the method, the amount of the second particles of the composite particles may be about 3 to about 30 at %. For example, in some embodiments, the amount of the second particles may be about 5 to about 25 at %, and in other embodiments, the amount of the second particles may be about 7 to about 25 at %.

A negative active material including the second particles within the amount ranges described above may have a high capacity per weight and an improved cycle characteristic.

The preparing of the composite particles may be performed by physical vapor deposition, chemical vapor deposition, electroplating, or electroless plating. For example, the preparing of the composite particles may be desirably performed by electroless plating.

For example, the electroless plating may be performed using a plating solution having pH of 8 to 10 that includes a nickel source, such as nickel sulfate, nickel chloride, nickel acetate, or nickel hypophosphite, and a pH adjuster, such as ammonium hydroxide or ammonium acetate. A temperature of the plating solution may be from about 50 to about 90° C., and a plating time may be from about 10 to about 120 minutes.

When the negative active material is prepared by electroless plating, an additional process for improving surface conductivity is not needed, and particles of an element, for example, Ni, may be uniformly coated partially or completely on surface(s) of first particles.

The heat-treating process may be performed at about 300 to about 600° C. For example, in some embodiments, the heat treatment temperature may be from about 300 to 500° C., and in other embodiments, the heat treatment temperature may be from about 350 to about 500° C. For example, the heat-treating process may be in a vacuum atmosphere at about 10 to about 12 torr for about 30 minutes to about 2 hours.

When the negative active material is prepared by performing a heat treatment process within the temperature ranges described above, particles of Ni may be more rigidly adhered partially or completely to surface(s) of plurality of first particles, without changing a phase composition of the plurality of first particles.

According to another aspect of the present invention, a lithium battery may include a positive electrode including a positive active material; a negative electrode including the negative active material described above, and an electrolytic solution disposed between the positive electrode and the negative electrode. The lithium battery may have an improved cycle characteristic and an improved capacity retention rate.

Figure 3:
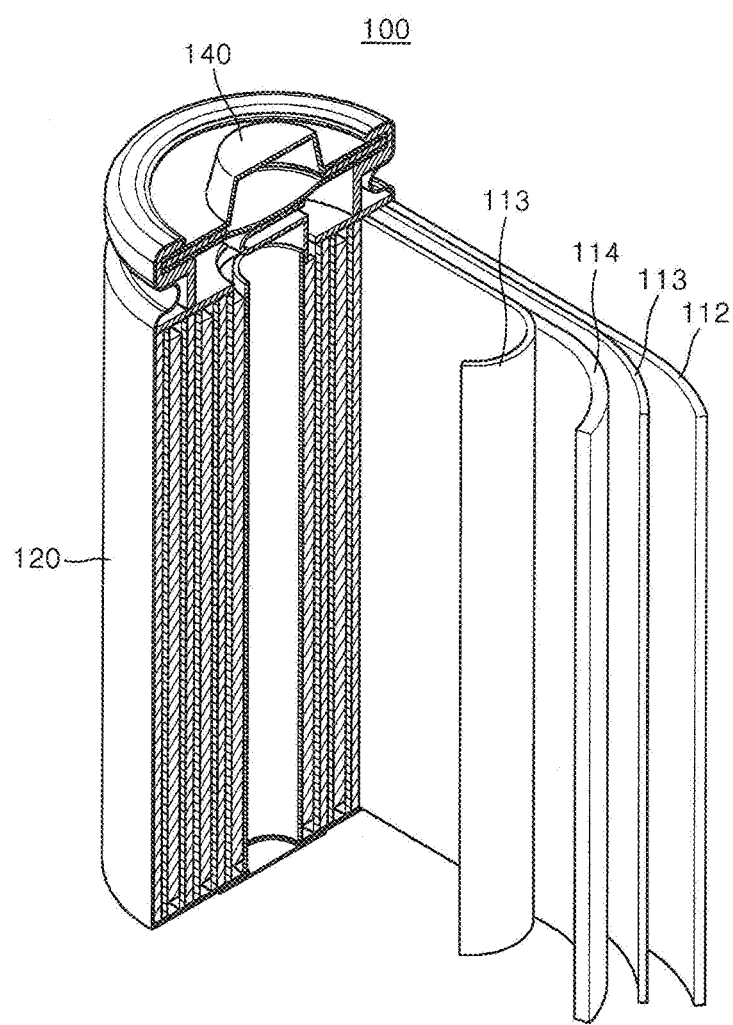
FIG. 3 is an exploded perspective view of a lithium battery according to an embodiment of the present invention.

FIG. 3 is an exploded perspective view of a lithium battery 100 according to an embodiment of the present invention. Referring to FIG. 3, the lithium battery 100 includes a positive electrode 114, a negative electrode 112, a separator 113 between the positive electrode 114 and the negative electrode 112, an electrolyte (not shown) which impregnates the positive electrode 114, the negative electrode 112, and the separator 113, a battery container 120, and a sealing member 140 for sealing the battery container 120. The negative electrode 112, the separator 113, the positive electrode 114, and the separator 113 are sequentially deposited and then wound in a spiral form and then, the wound structure is placed in the battery container 120 and sealed with the sealing member 140, thereby manufacturing the lithium battery 100.

The positive electrode 114 may include a current collector and a positive active material layer disposed on the current collector. Examples of positive active materials that may be used to form the positive active material layer may include compounds that allow lithium ion to be reversibly intercalated and deintercalated, for example, lithiated intercalation compounds. The positive active material may be a compound represented by any of the following formulae: $Li_aA_{1-b}X_bD_2$ (where $0.95 \le a \le 1.1$ and $0 \le b \le 0.5$); $Li_aE_{1-b}X_bO_{2-c}D_c$ (where $0.95 \le a \le 1.1$, $0 \le b \le 0.5$, and $0 \le c \le 0.05$); $LiE_{2-b}X_bO_{4-c}D_c$ (where $0 \le b \le 0.5$ and $0 \le c \le 0.05$); $Li_aNi_{1-b-c}Co_bB_cD_\alpha$ (where $0.95 \le a \le 1.1$, $0 \le b \le 0.5$, $0 \le c \le 0.05$, and $0 < \alpha \le 2$); $Li_aNi_{1-b-c}Co_bO_2M_\alpha$ (where $0.95 \le a \le 1.1$, $0 \le b \le 0.5$, $0 \le c \le 0.05$, and $0 \le \alpha \le 2$); $Li_aNi_{1-b-c}Co_bX_cO_{2-\alpha}M_2$ (where $0.95 \le a \le 1.1$, $0 \le b \le 0.5$, $0 \le c \le 0.05$, and $0 < \alpha < 2$); $Li_aNi_{1-b-c}Mn_bX_cD_\alpha$ (where $0.95 \le a \le 1.1$, $0 \le b \le 0.5$, $0 \le c \le 0.05$, and $0 < \alpha \le 2$); $Li_aNi_{1-b-c}Mn_bX_cO_{2-\alpha}M_\alpha$ (where $0.95 \le a \le 1.1$, $0 \le b \le 0.5$, $0 \le c \le 0.05$, and $0 < \alpha < 2$); $Li_aNi_{1-b-c}Mn_bX_cO_{2-\alpha}M_2$ (where $0.95 \le a \le 1.1$, $0 \le b \le 0.5$, $0 \le c \le 0.05$, and $0 < \alpha < 2$); $Li_aNi_bE_cG_dO_2$ (where $0.90 \le a \le 1.1$, $0 < b \le 0.9$, $0 \le c \le 0.5$, and $0.001 \le d \le 0.1$); $Li_aNi_bCo_cMn_dG_eO_2$ (where $0.90 \le a \le 1.1$, $0 \le b \le 0.9$, $0 \le c \le 0.5$, $0 \le d \le 0.5$, and $0 \le e \le 0.1$); $Li_aNiG_bO_2$ (where $0.90 \le a \le 1.1$ and $0.001 \le b \le 0.1$); $Li_aCoG_bO_2$ (where $0.90 \le a \le 1.1$ and $0.001 \le b \le 0.1$); $Li_aMnG_bO_2$ (where $0.90 \le a \le 1.1$ and $0.001 \le b \le 0.1$); $Li_aMn_2G_bO_4$ (where $0.90 \le a \le 1.1$ and $0 \le b \le 0.1$); $QO_2$; $QS_2$; $LiQS_2$; $V_2O_5$; $LiZO_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); $LiFePO_4$; and lithium titanate.

In these chemical formulae above, A is selected from Ni, Co, Mn, or a combination thereof, but is not limited thereto; X is selected from Al, Ni, Co, Mn, Cr, Fe, Mg, Sr, V, rare earth elements, or a combination thereof, but is not limited thereto; D is selected from O, F, S, P, or a combination thereof, but is not limited thereto; E is selected from Co, Mn, or a combination thereof, but is not limited thereto; M is selected from F, S, P, or a combination thereof, but is not limited thereto; G is selected from Al, Cr, Mn, Fe, Mg, La, Ce, Sr, V, or a combination thereof, but is not limited thereto; Q is selected from Ti, Mo, Mn, or a combination thereof, but is not limited thereto; Z is selected from Cr, V, Fe, Sc, Y, or a combination thereof, but is not limited thereto; and J is selected from V, Cr, Mn, Co, Ni, Cu, or a combination thereof, but is not limited thereto. For example, the positive active material may be lithium titanate.

The lithium titanate may have any crystal structure, such as a spinel type lithium titanate, an anatase type lithium titanate, or a ramsdellite type lithium titanate.

In particular, the positive active material may be represented by $Li_{4-x}Ti_5O_{12}$ (where $0 \le x \le 3$). For example, the positive active material may be $Li_4Ti_5O_{12}$, however, any suitable positive active material may be used.

Alternatively, the positive active material may be $Li_aNi_bCo_cMn_dG_eO_2$ (where $0.90 \le a \le 1.1$, $0 \le b \le 0.9$, $0 \le c \le 0.5$, $0 \le d \le 0.5$, and e=0). For example, the positive active material may be $Li_aNi_bCo_cMn_dG_eO_2$ (where a=1, b=0.5, c=0.2, d=0.3, and e=0), or $LiMn_2O_4$, however, any suitable positive active material may be used.

A lithium electrode may be used as the positive electrode 114.

The compounds used as the positive active material may further include a coating layer on their surfaces. Alternatively, the compounds used as the positive active material may be used in combination with the compounds having the coating layer on their surfaces. The coating layer may include at least one coating-element-containing compound selected from the group consisting of a coating-element-containing oxide, a coating-element-containing hydroxide, a coating-element-containing oxyhydroxide, a coating-element-containing oxycarbonate, a coating-element-containing hydroxy carbonate, and combinations thereof. The coating-element-containing compounds may be amorphous or crystalline. The coating element included in the coating layer may be Mg, Al, Co, K, Na, Ca, Si, Ti, V, Sri, Ge, Ga, B, As, Zr, or a mixture thereof.

The coating layer may be formed by using the coating, elements in the aforementioned compounds by using any method that does not adversely affect the physical properties of the positive active material (e.g., spray coating or immersion may be used). The coating layer formation methods are known to those of ordinary skill in the art.

The positive active material layer may further include a binder.

The binder may allow positive active material particles to adhere to each other and to the current collector. Examples of the binder may include, but are not limited to, polyamide imide, polyvinylalcohol, carboxymethylcellulose, hydroxypropylcellulose, diacetylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubber, acrylated styrene-butadiene rubber, epoxy resins, and nylon.

The current collector may be an Al current collector, however, any suitable current collector may be used.

To prepare the positive electrode 114, a positive active material and a binder (and optionally a conductive material) are mixed in a solvent to prepare a composition for forming a positive active material layer, and the composition is applied to a current collector. Methods of manufacturing positive electrodes are known in the art, and thus a detailed description thereof is not provided herein. The solvent may be N-methylpyrrolidone, but the solvent is not limited thereto.

The positive active material layer may further include a conductive material. The conductive material may be at least one of carbon black, Ketjen black, acetylene black, artificial graphite, natural graphite, copper powder, nickel powder, aluminum powder, silver powder, or polyphenylene. However, the conductive material is not limited thereto.

The amount of each of the binder and the conductive material may be about 2 to about 5 parts by weight based on 100 parts by weight of the positive active material. The amount of the solvent may be about 1 to about 10 parts by weight based on 100 parts by weight of the positive active material. When the amounts of the binder, the conductive material, and the solvent are within the ranges described above, the positive active material layer may be relatively easily formed.

The negative electrode 112 may include a current collector and a negative active material layer formed on the current collector. A negative active material for forming the negative active material layer may be a negative active material including a plurality of first particles including Si, Ti, and Ni and composite particles comprising a plurality of second particles in which at least one element selected from the group consisting of Cu, Fe, Ni, Au, Ag, Pd, Cr, Mn, Ti, B, and P is partially or completely deposited on surface(s) of other of first particles.

Since the negative active material includes the first particles having a high capability of intercalating and deintercalating lithium ions and the composite particles comprised of a plurality of second particles that do not interfere with an approach of lithium ions to an active Si phase capable of reversibly reacting with the lithium ions and suppresses a side reaction with an electrolytic solution, a lithium battery including the negative active material may have a high electric conductivity, improved cycle characteristics, and an improved capacity retention rate.

The negative active material described above may be used to form the negative active materials layer.

The negative active material layer may further include a binder. The binder may be one or more of the binders described for use in the positive electrode.

The current collector of the negative electrode 112 may be a Cu current collector, but it is not limited thereto. For example, the current collector may be formed of stainless steel, aluminum, nickel, titanium, heat-treated carbon, copper, stainless steel that is surface-treated with carbon, nickel, titanium, or silver, or an Al—Cd alloy. In addition, as in the current collector of the positive electrode 114, the current collector of the negative electrode 112 may have fine unevenness on its surface so as to increase the adhesive strength of the current collector to the negative active material. The current collector of the negative electrode may be used in any suitable form including films, sheets, foils, nets, porous structures, foams, or non-woven fabrics.

The negative active material layer may optionally farther include a conductive material. The conductive material may be one or more of the same conductive materials as those described for use in the positive electrode.

To prepare the negative electrode 112, a negative active material and a binder (and optionally a conductive material) are mixed in a solvent to prepare a composition for forming a negative active material layer, and the composition is applied to a current collector. Methods of manufacturing negative electrodes are known in the art, and thus, a detailed description thereof is not provided herein. The solvent may be N-methylpyrrolidone, but the solvent is not limited thereto.

The amount of each of the binder and the conductive material may be about 2 to about 5 parts by weight based on 100 parts by weight of the negative active material. The amount of the solvent may be about 1 to about 10 parts by weight based on 100 parts by weight of the negative active material. When the amounts of the binder, the conductive material, and the solvent are within the ranges described above, the negative active material layer may be relatively easily formed.

If desired, both the composition for forming the positive active material layer and the composition for forming the negative active material layer may further include a plasticizer to form pores in the electrode plate.

The electrolytic solution may include a non-aqueous organic solvent and a lithium salt.

The non-aqueous organic solvent may act as a medium through which ions involved in an electrochemical reaction of a lithium battery may be transported.

The non-aqueous organic solvent may be a carbonate-based solvent, an ester-based solvent, an ether-based solvent, a ketone-based solvent, an alcohol-based solvent, or an aprotic solvent. Examples of the carbonate-based solvent may include dimethyl carbonate (DMC), diethyl carbonate (DEC), dipropyl carbonate (DPC), methylpropyl carbonate (MPC), ethyl propyl carbonate (EPC), ethyl methyl carbonate (EMC), ethylene carbonate (EC), propylene carbonate (PC), and butylene carbonate (BC). Examples of the ester-based solvent may include methyl acetate, ethyl acetate, n-propyl acetate, dimethylacetate, methyl propionate, ethyl propionate, γ-butyrolactone, decanolide, valerolactone, mevalonolactone, and caprolactone. Examples of the ether-based solvent may include dibutyl ether, tetraglyme, diglyme, dimethoxyethane, 2-methyltetrahydrofuran, and tetrahydrofuran. An example of the ketone-based solvent may be cyclohexanone. Examples of the alcohol-based solvent may include ethyl alcohol and isopropyl alcohol. Examples of the aprotic solvent may include nitriles, such as R—CN, where R is a $C_2$ to $C_{20}$ linear, branched, or cyclic hydrocarbon that may include a double-bond, an aromatic ring or an ether bond; amides, such as dimethylformamide; dioxolanes, such as 1,3-dioxolane; and sulfolanes.

A single non-aqueous organic solvent may be used alone or two or more non-aqueous organic solvents may be used in combination. If two or more non-aqueous organic solvents are used in combination, a volume ratio of the solvents may be appropriately adjusted according to the desired performance of the battery. Such adjustments would be known to those of ordinary skill in the art.

The lithium salt is dissolved in the non-aqueous organic solvent and acts as a lithium-ion source, thereby enabling the basic operation of the lithium battery by promoting transfer of lithium ions between the positive electrode and the negative electrode. For example, the lithium salt may be at least one supporting electrolytic salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ [lithium bis(oxalate) borate; LiBOB]. The concentration of the lithium salt may be about 0.1 to about 2.0 M. If the concentration of the lithium salt is within this range, the electrolyte has appropriate conductivity and viscosity and thus exhibits good electrolytic performance, and lithium ions may effectively migrate.

According to the type of lithium battery, the separator 113 may be disposed between the positive electrode 114 and the negative electrode 112. The separator may be a single layer of polyethylene, polypropylene, or polyvinylidene fluoride, or multiple layers of at least two of these materials. Also, the separator may be a mixed multi-layer, such as a polyethylene/polypropylene layer, a polyethylene/polypropylene/polyethylene layer, or a polypropylene/polyethylene/polypropylene layer.

Lithium batteries can be classified as lithium ion batteries, lithium ion polymer batteries, or lithium polymer batteries, according to the separator and the electrolyte. Lithium batteries can be classified as cylindrical, rectangular, coin type, or pouch-type, according to the shape of the lithium battery. Lithium batteries can also be classified as a bulk-type or a film-type, according to the size of the lithium battery. The lithium batteries described above may be used in lithium primary batteries or lithium secondary batteries. The manufacturing methods of the lithium batteries described above are known in the art, and thus, a detailed description thereof is not provided herein.

One or more embodiments of the present invention will now be described more fully with reference to the following examples. However, these examples are provided for illustrative purposes only and are not intended to limit the scope of the present invention.

EXAMPLES (Preparation of Negative Active Material)

Example 1

A powder-type 68 at % Si-16 at % Ti-16 at % Ni alloy (manufactured by Aldrich) that had been passed through a 325-mesh sieve was purified in a solution of $H_2O_2:NH_4OH$ mixed at a molar ratio of 1:1 and washed with distilled water to prepare powder-type alloy particles, i.e., first particles. Subsequently, nickel was coated on surfaces of the first particles by using a plating solution prepared by adding 0.05M $NiSO_4$ and 0.02M $NH_4OH$ until the pH thereof reached 9.6 by electroless plating at 55° C. for 45 minutes to prepare composite particles comprised of second particles. Then, the prepared composite particles were washed with distilled water and heat treated in a vacuum atmosphere of $10^{-5}$ torr at 350° C. for 1 hour, thereby completing the preparation of a negative active material.

A scanning electron microscopic (SEM) image showing the above negative active material is shown in FIG. 1. Referring to FIG. 1, the negative active material includes a plurality of first particles and composite particles comprised of second particles in which Ni is partially or completely coated on surface(s) of other of first particles, and it is confirmed that the composite particles are formed in a plurality of island types among the plurality of first particles.

Example 2

A negative active material was prepared in the same manner as in Example 1, except that the prepared composite particles were purified in a 0.005M HF solution before being washed with distilled water and then heat treated the composite particles in a vacuum atmosphere of $10^{-5}$ torr at 500° C. for 1 hour, instead of washing the prepared composite particles with distilled water and then heat treating the composite particles in a vacuum atmosphere of $10^{-5}$ torr at 350° C. for 1 hour.

Comparative Example 1

A powder-type 68 at % Si-16 at % Ti-16 at % Ni alloy (manufactured by Aldrich) that had been passed through a 325-mesh sieve was prepared.

(Manufacture of Lithium Batteries)

Example 3

The negative active material prepared according to Example 1, polyamide imide, and Ketjen black were mixed at a weight ratio of 90:8:2 in N-methylpyrrolidone to prepare a negative active material slurry. The negative active material slurry was coated on a Cu current collector having a thickness of 10 μm using a doctor blade. The coated Cu current collector was dried in a vacuum at 350° C. for 1 hour, thereby forming a negative active material layer having a thickness of 42 μm stacked on the Cu current collector. Then, a hole having a diameter of 16 mm was made therethrough, thereby completing the manufacture of a negative electrode.

The above negative electrode, a lithium electrode as a counter electrode, a microporous polypropylene separator (Celgard 3501), and an electrolytic solution including ethylene carbonate (EC), diethyl carbonate (DEC), and fluoroethylene carbonate (FEC) (a volume ratio of EC:DEC:FEC was 5:75:25) were assembled in a helium-filled glove box to manufacture a coin-type half cell.

Example 4

Another coin-type half cell was manufactured in the same manner as in Example 3, except that the negative active material prepared according to Example 2 was used instead of the negative active material of Example 1.

Comparative Example 2

A comparative coin-type half cell was manufactured in the same manner as in Example 3, except that the negative active material prepared according to Comparative Example 1 was used instead of the negative active material of Example 1.

(Evaluation of the Above Negative Active Material and Performance Evaluation of Lithium Batteries)

Evaluation 1: X-Ray Diffraction (XRD) Measurement

Figure 2:
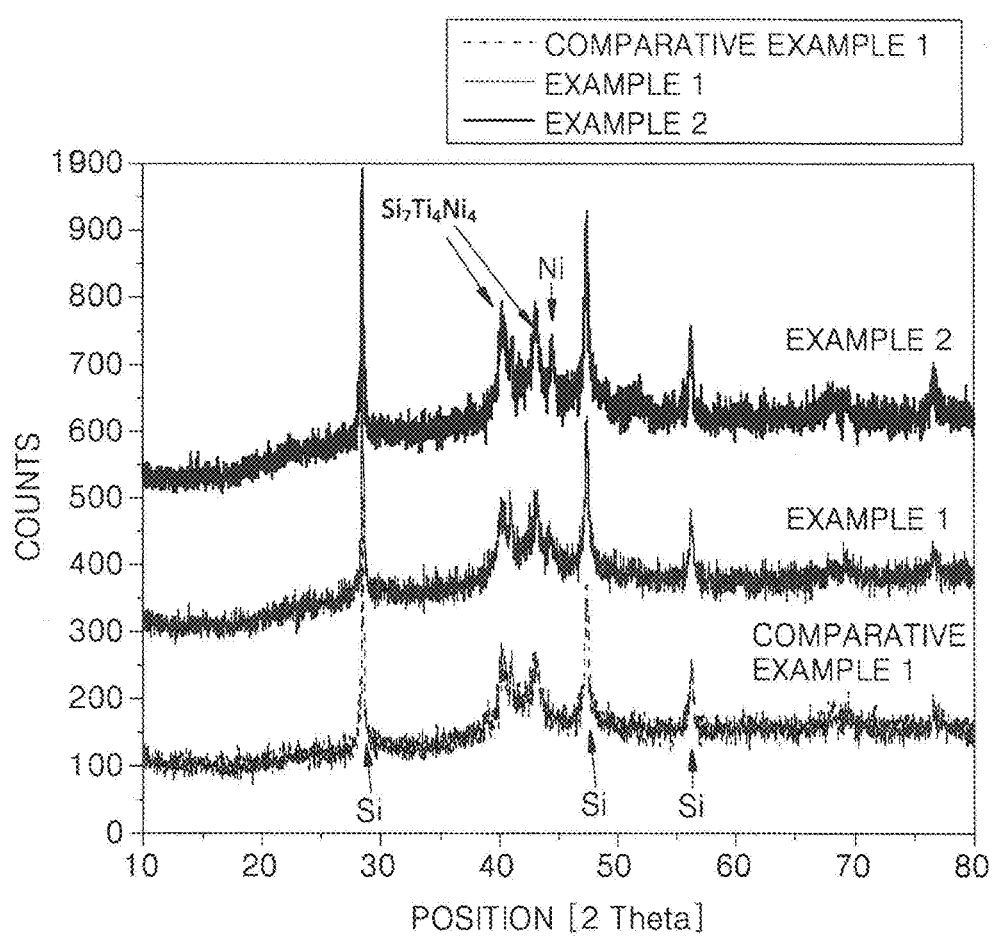
FIG. 2 is a graph showing powder X-ray diffraction (XRD) analysis results of negative active materials prepared according to Examples 1 and 2 and Comparative Example 1 according to an embodiment of the present invention.

XRD analysis was performed on the negative active materials of Examples 1 and 2 and Comparative Example 1, and the results are shown in FIG. 2. The test conditions were as follows: CuK-α X-ray wavelength of 1.541 Å.

Referring to FIG. 2, in the XRD analysis of the negative active materials of the Examples 1 and 2, an active Si phase and a matrix phase in which the ratio of atomic percents of Si to Ti to Ni is 7:4:4 were observed. In addition, a peak corresponding to a Ni (111) plane of a Ni phase was distinctly observed at a Bragg (2θ) angle of 44.5°±0.05° in the Examples 1 and 2. In contrast, in the XRD analysis of the negative active material of the Comparative Example 1, an active Si phase and a matrix phase in which the ratio of atomic percents of Si to Ti to Ni is 7:4:4 were observed, while a peak for the Ni phase was not observed.

Also, in the XRD analysis of the negative active materials of the Examples 1 and 2, a peak corresponding to the Ni (111) plane of the Ni phase was observed at a Bragg (2θ) angle of 44.5°. The full width at half maximum (FWHM) obtained from that peak and an average diameter of the second particles (in other words, Ni particles) are shown in Table 1 below.

TABLE 1

| | Full width at half maximum (FWHM) (°) | Average diameter of second particles (i.e., Ni particle) (nm) |
|---|---|---|
| Example 1 | 0.185 | 52 |
| Example 2 | 0.187 | 51 |

Referring to Table 1, it is confirmed that the average diameters of the second particles (i.e., Ni particles) included in the negative active materials of the Examples 1 and 2 are 52 nm and 51 nm, respectively.

Evaluation 2: Energy Dispersing X-Ray (EDX) Measurement

An Energy Dispersing X-ray (EDX) test was performed on cross-sections of a plurality of first particles and a plurality of second particles in which Ni was coated on surfaces of other of first particles included in the negative active material of the Example 1, and a plurality of first particles in the negative active material of Comparative Example 1, The results are shown in Table 2 below.

In this regard, spot 1a and spot 1b denote measurement results at different spots of the surfaces of the coated second particles in the Example 1 and the first particles in the Comparative Example 1.

The amount of the coated second particles may be obtained by subtracting an atomic percent of Ni of the negative active material of the Comparative Example 1 from an atomic percent of Ni of the negative active material of the Example 1 at each of spot 1a and spot 1b, respectively.

TABLE 2

| | Region | Atomic percent of O (at %) | Atomic percent of Si (at %) | Atomic percent of Ti (at %) | Atomic percent of Ni (at %) | Amount of coated second particles (at %) |
|---|---|---|---|---|---|---|
| Example 1 | spot 1a | 12.35 | 51.45 | 13.14 | 23.07 | 8.94 |
| | spot 1b | 8.21 | 53.58 | 16.45 | 21.76 | 8.74 |
| Comparative | spot 1a | 8.12 | 64.27 | 13.48 | 14.13 | — |
| Example 1 | spot 1b | 9.56 | 65.16 | 12.25 | 13.02 | — |

Referring to Table 2, it is confirmed that the amounts of the coated second particles contained in the negative active material of the Example 1 are 8.94 at % and 8.74 at % at the respective spots.

Evaluation 3: Measurement of Capacity and Cycle Characteristics

Figure 4:
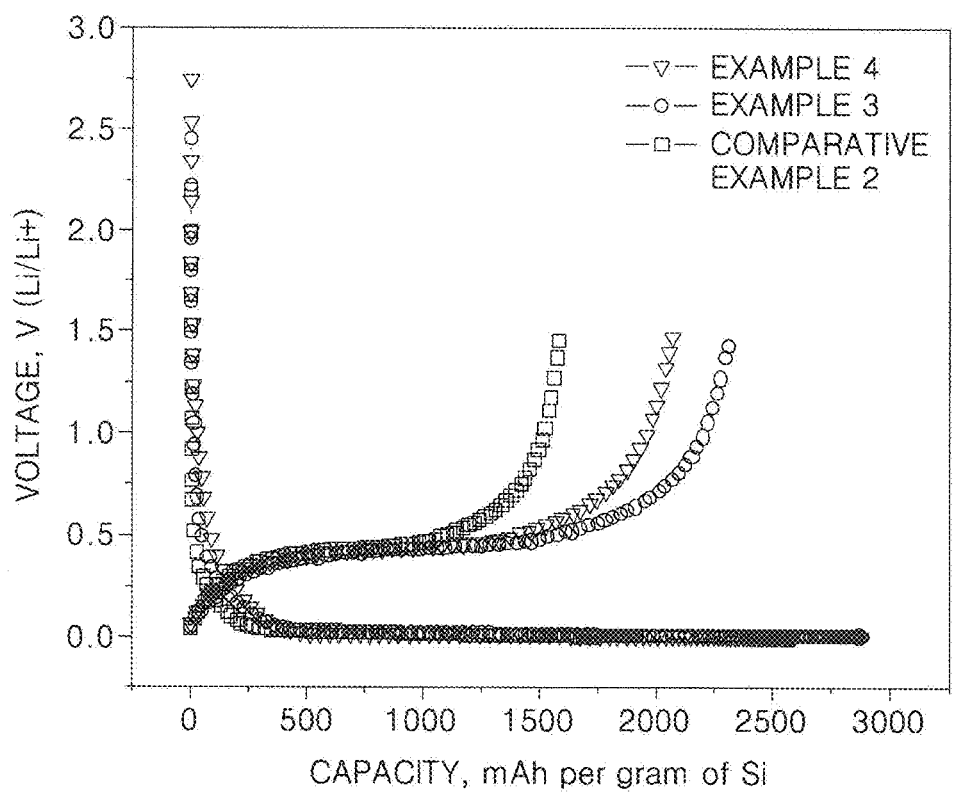
FIG. 4 is a graph showing an initial charging/discharging curve of lithium batteries manufactured according to Examples 3 and 4 and Comparative Example 2 according to an embodiment of the present invention.

Cell characteristics of the coin-type half cells manufactured according to Examples 3 and 4 and Comparative Example 2 were evaluated, and the results are shown in FIG. 4 and Table 3.

FIG. 4 illustrates results of initial charge/discharge tests of the coin-type half cells of the Examples 3 and 4 and the Comparative Example 2. The initial charge/discharge tests were performed at a charge/discharge current density of 0.1 C, a charge cut-off voltage of 10 mV (Li/Li$^+$), and a discharge cut-off voltage of 1.5 V (Li/Li$^+$).

Figure 5:
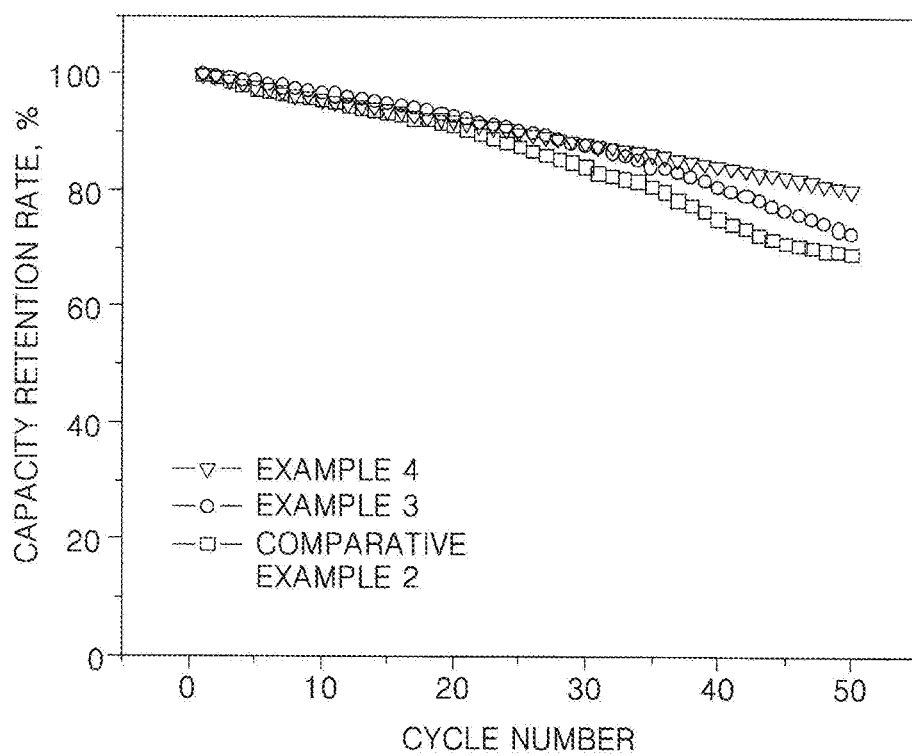
FIG. 5 is a graph showing capacity retention rates of the lithium batteries of Examples 3 and 4 and Comparative Example 2 according to an embodiment of the present invention.

FIG. 5 illustrates capacity retention rates obtained by repeatedly charging and discharging the coin-type half cells of the Examples 3 and 4 and the Comparative Example 2 as follows: once at 0.2 C and up to 50 cycles at 1 C. A change in capacity according to each cycle was measured, and the capacity retention rate was calculated therefrom. The capacity retention rate (%) is obtained using Equation 1 below.

$$\text{Capacity retention rate}(\%) [(\text{discharge capacity at } 50^{th} \text{ cycle})/(\text{discharge capacity at } 1^{st} \text{ cycle})] \times 100 \quad \text{Equation 1}$$

TABLE 3

| | Discharge capacity at 1$^{st}$ cycle (mAh/g) | discharge capacity at 50$^{th}$ cycle ((mAh/g) | Capacity etention rate (%) |
|---|---|---|---|
| Example 3 | 2325 | 1695 | 72.9 |
| Example 4 | 2076 | 1667 | 80.3 |
| Comparative Example 2 | 1584 | 1098 | 69.3 |

Referring to FIGS. 4 through 5 and Table 3, the lithium batteries of the Examples 3 and 4 have higher initial discharge capacities, and higher capacity retention rates than those in the lithium battery of Comparative Example 2.

As described above, according to the one or more of the above embodiments of the present invention, a negative active material includes a plurality of first particles including Si, Ti, and Ni and composite particles, wherein the composite particles are comprised of a plurality of second particles in which at least one element selected from the group consisting of Cu, Fe, Ni, Au, Ag, Pd, Cr, Mn, Ti, B, and P is partially or completely deposited on surface(s) of other of first particles. The negative active material facilitates an approach of lithium ions to an active Si phase of the Si-based alloy and suppresses a side reaction with an electrolytic solution. Therefore, a lithium battery including a negative electrode including the negative active material may have an improved cycle characteristic and capacity retention rate.

It should be understood that the exemplary embodiments described herein should be considered in a descriptive sense only and not for purposes of limitation. Descriptions of features or aspects within each embodiment should typically be considered as available for other similar features or aspects in other embodiments that may be constructed according to the principles of the present invention.

What is claimed is:

1. A negative active material for a lithium battery comprising a plurality of particles comprising:

a plurality of first particles comprising Si, Ti, and Ni; and composite particles, wherein the composite particles comprise a plurality of second particles in which at least one element selected from the group consisting of Cu, Fe, Ni, Au, Ag, Pd, Cr, Mn, Ti, B, and P is partially or completely deposited on surface(s) of some of the plurality of first particles, wherein the second particles of the composite particles have an average diameter of about 40 nm to about 400 nm.

2. The negative active material for a lithium battery of claim 1, wherein the composite particles comprise a plurality of second particles in which Ni, $Ni_{1-x}P_x$ (where $0.1 \leq x \leq 0.3$) or $Ni_{1-x}B_x$ (where $0.1 \leq x \leq 0.3$) is partially or completely deposited on the surface(s) of some of the plurality of first particles.

3. The negative active material for a lithium battery of claim 1, wherein the composite particles comprise a plurality of second particles in which Ni is partially or completely deposited on the surface(s) of some of the plurality of first particles.

4. The negative active material for a lithium battery of claim 1, wherein the composite particles are formed in a plurality of island shapes among the plurality of first particles.

5. The negative active material for a lithium battery of claim 4, wherein the composite particles constitutes 50% or less of the total number of the plurality of first particles.

6. The negative active material for a lithium battery of claim 4, wherein the composite particles constitutes about 10% to about 30% of the total number of the plurality of first particles.

7. The negative active material for a lithium battery of claim 1, wherein an amount of the second particles is about 3 to about 30 atomic percent (at %) of the composite particles.

8. The negative active material for a lithium battery of claim 1, wherein the plurality of first particles are crystalline alloy particles.

9. The negative active material for a lithium battery of claim 1, wherein the plurality of first particles have a median particle diameter (D50) of about 0.1 μm to about 10 μm.

10. The negative active material for a lithium battery of claim 1, wherein the plurality of first particles have a composition represented by Formula 1 below:

$x$Si-$y$Ti-$z$Ni                            <Formula 1> wherein 50 at % $\leq x \leq$ 80 at %, 5 at % $\leq y \leq$ 30 at %, 5 at % $\leq z \leq$ 30 at %, and x+y+z=100 at %.

11. A lithium battery comprising:
a positive electrode comprising a positive active material;
a negative electrode comprising the negative active material according to claim 1; and
an electrolytic solution disposed between the positive electrode and the negative electrode.

* * * * *